United States Patent
Murakami et al.

(10) Patent No.: US 6,794,851 B2
(45) Date of Patent: Sep. 21, 2004

(54) CHARGING CIRCUIT AND BATTERY CHARGER

(75) Inventors: Kouji Murakami, Iizuka (JP); Hidetoshi Hamai, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 271 days.

(21) Appl. No.: 10/281,832

(22) Filed: Oct. 28, 2002

(65) Prior Publication Data

US 2003/0160592 A1 Aug. 28, 2003

(30) Foreign Application Priority Data

Feb. 28, 2002 (JP) .................................. 2002-053119

(51) Int. Cl.[7] ............................................... H02J 7/00
(52) U.S. Cl. ...................................................... 320/119
(58) Field of Search ............................. 320/119, 116, 320/124, 125, 126, 160, 162, 163; 307/64, 66, 56

(56) References Cited

U.S. PATENT DOCUMENTS

| | | | |
|---|---|---|---|
| 5,028,859 A | | 7/1991 | Johnson et al. ............. 320/125 |
| 6,081,096 A | * | 6/2000 | Barkat et al. ............... 320/124 |
| 6,194,867 B1 | * | 2/2001 | Cummings et al. .......... 320/119 |

FOREIGN PATENT DOCUMENTS

JP          8-8747          1/1996

\* cited by examiner

*Primary Examiner*—Pia Tibbits
(74) *Attorney, Agent, or Firm*—Ladas & Parry

(57) ABSTRACT

A charging circuit charging predetermined first and second batteries includes: a circuit configuration by which a second charging current charging the second battery is obtained by subtracting a first charging current charging the first battery from a current supplied by a power source; and a current setting part that sets the second charging current smaller than the first charging current at least at the beginning of charging.

12 Claims, 9 Drawing Sheets

CHARGING CIRCUIT AND BATTERY CHARGER

BACKGROUND OF THE INVENTION

1. Field of the Invention

The present invention relates to charging circuits charging predetermined first and second batteries and a battery charger incorporating such a charging circuit.

2. Description of the Related Art

Recently, mobile communication using mobile phones has been rapidly expanding. The reason is the convenience that users can enjoy mobile communication using mobile phones irrespective of the time and place. In order to ensure such convenience, it is required that a battery charger charging a battery used for a mobile phone can charge a spare battery as well as the battery in the mobile phone body.

FIG. 1 shows a conventional charging system 100 relating to a battery charger that charges a spare battery as well as a battery in a mobile phone body. The charging system 100 includes a spare battery 101 having a low priority in charging, a portable set 102 such as a mobile phone, a main battery 103 having a high priority in the charging provided in the portable set 102, a transistor 104, a charging circuit 105 in the portable set 102, a current detector 106, a microcomputer and control circuit 107 (hereinafter referred to as a "control circuit 107"), a charge control circuit 108 that controls switching of the transistor 104, a transistor 109, a charge control circuit 110 that controls switching of the transistor 109, and a resistor 111 as a thermistor element for controlling the temperature of the spare battery 101.

The charging system 100 charges both spare battery 101 and main battery 103. In addition, it is assumed that, in an initial state, the transistor 104 is in an ON-state and the transistor 109 is in an OFF-state.

An AC adapter 150 converts an alternating current supplied from an alternator (not shown) to a direct current and supplies the direct current to the spare battery 101 and the main battery 103 as a charging current. The current detector 106 detects the charging current supplied to the main battery 103 and sends the detection result to the control circuit 107.

In a case where the current detector 106 is detecting the charging current, in other words, where the charging circuit 105 is charging the main battery 103, the control circuit 107 does not instruct the charge control circuits 108 and 110 to perform the switching of the transistors 104 and 109, respectively. For this reason, the ON-state of the transistor 104 and the OFF-state of the transistor 109 are maintained. Thus, charging of only the main battery 103 is continued.

On the other hand, in a case where the current detector 106 detects no charging current, in other words, where the main battery 103 is fully charged, the control circuit 107 instructs the charge control circuits 108 and 110 to control the transistors 104 and 109, respectively. According to the instruction, the charge control circuit 108 decreases the base voltage of the transistor 104. Additionally, according to the instruction, the charge control circuit 110 increases the base voltage of the transistor 109. For this reason, the main battery 103 is supplied with only a small charging current. That is, so-called trickle charging is performed. On the other hand, the charging of the spare battery 101 is started such that a large charging current is supplied to the spare battery 101.

It should be noted that in a case where the main battery 103 is removed from the charging system 100, the current detector 106 does not detect a charging current. In this case, the control circuit 107 instructs the charge control circuits 108 and 110 to control the transistors 104 and 109, respectively. That is, according to the instruction, the charge control circuit 108 controls the transistor 104 to assume the OFF-state. On the other hand, the charge control circuit 110 controls the transistor 109 to assume the ON-state according to the instruction. Thus, the charging of the spare battery 101 is started such that a large charging current is supplied only to the spare battery 101.

FIG. 2 is a graph showing the variation of the charging current with time. Here, the charging current is supplied to the spare battery 101 and the main battery 103. First, as shown in FIG. 2, the charging current is supplied to the main battery 103. Then, as the main battery 103 is fully charged, the charging current supplied to the main battery 103 is decreased, and the charging current is almost zero when the charging is completed. Thereafter, trickle charging is performed on the main battery 103. Then, the charging current is supplied to the spare battery 101.

As an example of the prior art relating to the battery charger that charges not only the battery (main battery) in the mobile phone body but also the spare battery in the above-described manner, there is a "multiple battery, multiple rate battery charger" disclosed in Japanese Patent Publication No. 8-8747 (corresponding to U.S. Pat. No. 5028859).

However, in the above-described conventional charging procedure, though the charging current that is supplied to the main battery 103 from the AC adapter 150 is decreased, the spare battery 101 is not charged at that time. Thus, effective charging is not performed. Additionally, there is also a problem in that the manufacturing cost increases by using the control circuit 107.

SUMMARY OF THE INVENTION

Accordingly, it is a general object of the present invention to provide an improved and useful charging circuit and battery charger in which the above-mentioned problems are eliminated.

It is another and more specific object of the present invention to provide a charging circuit and a battery charger that can charge batteries effectively at low cost.

In order to achieve the above-described objects, according to one aspect of the present invention, there is provided a charging circuit charging predetermined first and second batteries including: a circuit configuration by which a second charging current charging the second battery is obtained by subtracting a first charging current charging the first battery from a current supplied by a power source; and a current setting part that sets the second charging current smaller than the first charging current at least at the beginning of charging.

Also, according to another aspect of the present invention, there is provided a battery charger incorporating the above-described charging circuit.

According to the above-mentioned aspects of the present invention, the second charging current is obtained by subtracting the first charging current used for charging the first battery from the current supplied by the power source. In addition, the amount of the second charging current is set smaller than that of the first charging current at least in the beginning of charging so that the first battery is charged earlier than the second battery. Hence, it is possible to perform effective charging while continuously varying the first and second charging currents and effectively using the charging current supplied by the power source.

Other objects, features and advantages of the present invention will become more apparent from the following detailed description when read in conjunction with the following drawings.

DETAILED DESCRIPTION OF THE PREFERRED EMBODIMENTS

In the following, basic principles and one embodiment of the present invention will be described with reference to the drawings.

First, a description will be given of the basic principles of the present invention, by referring to FIGS. 3 through 6.

Figure 1:
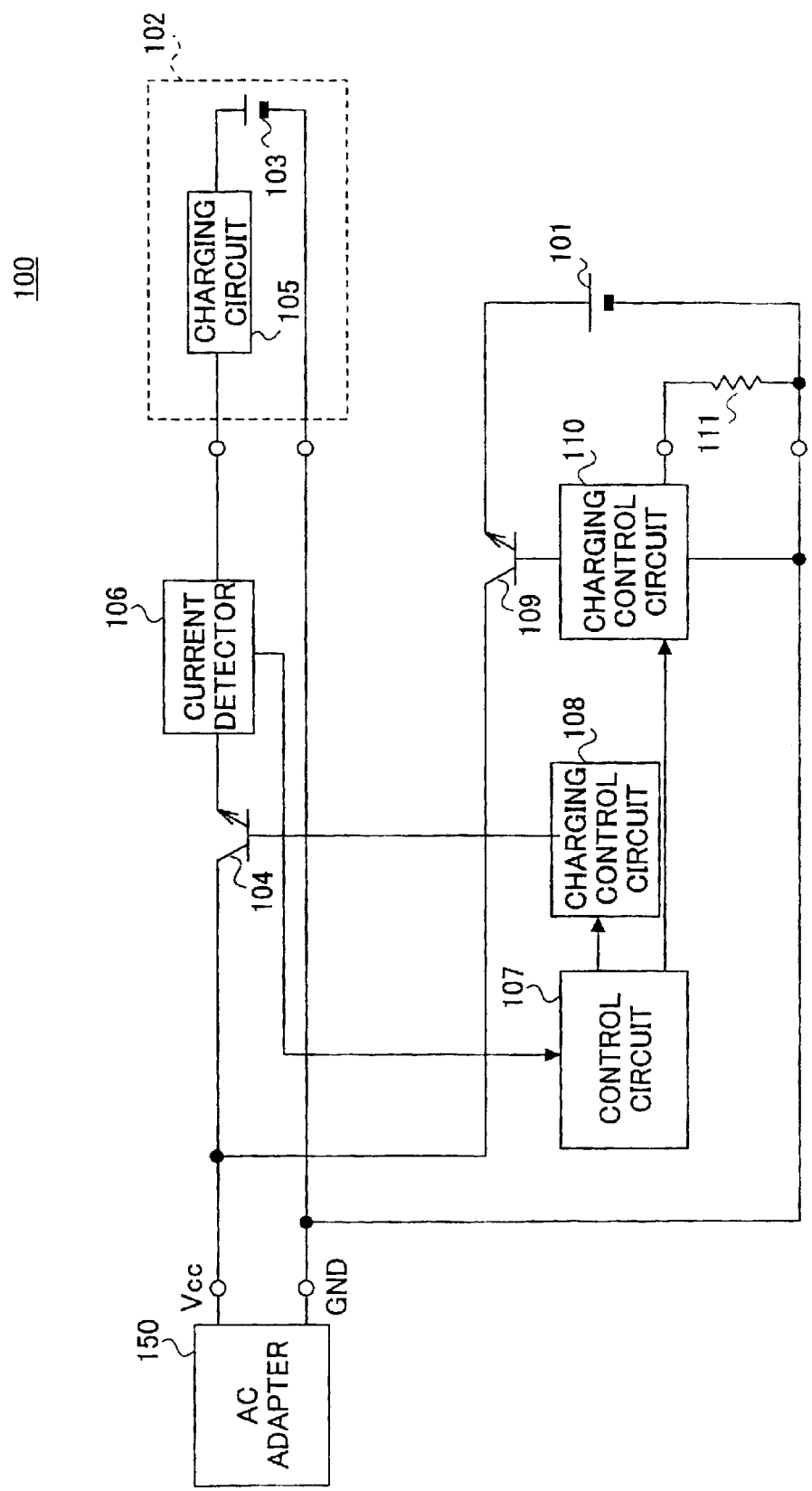
FIG. 1 is a block diagram showing an example of the structure of a conventional charging system.
Figure 2:
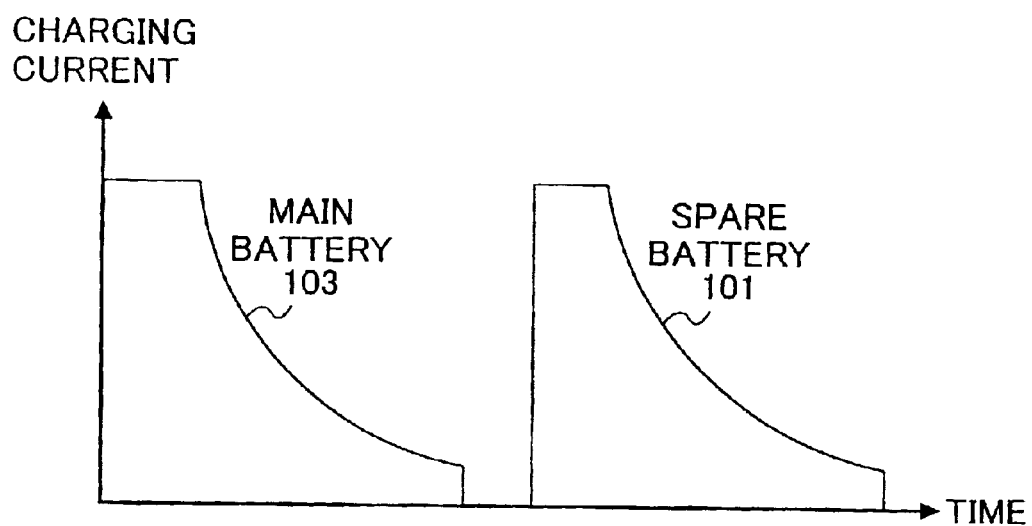
FIG. 2 is a graph showing the variation of a charging current with time in the conventional charging system.
Figure 3:
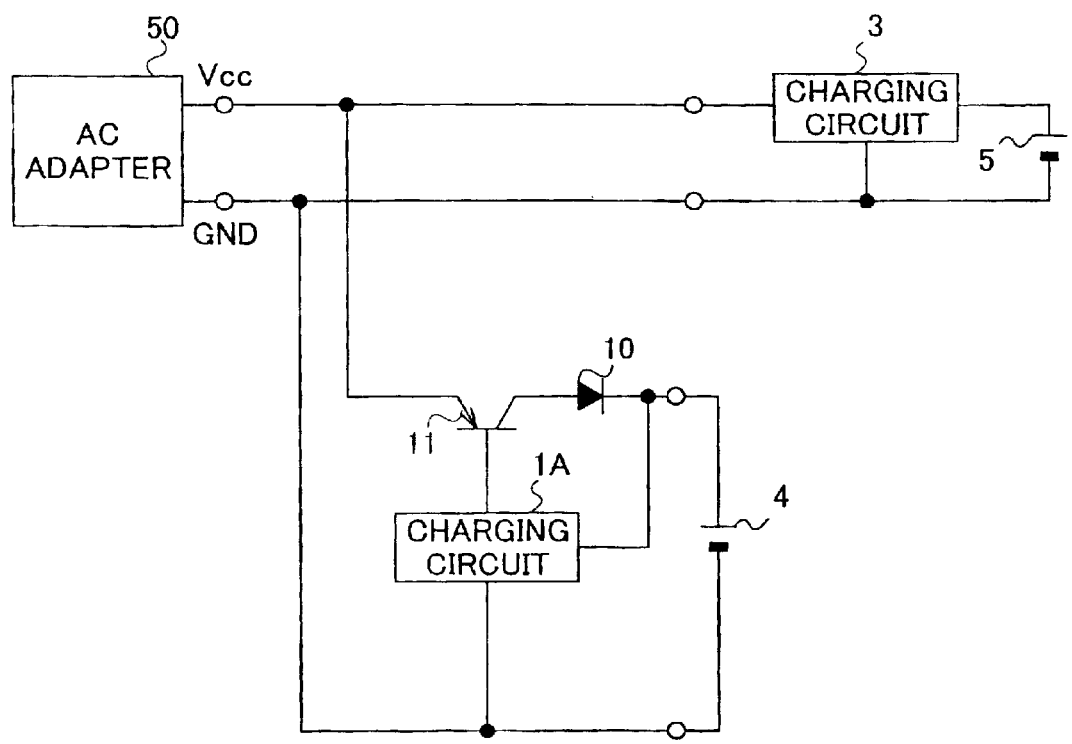
FIG. 3 is a block diagram showing the structure of a charging system for explaining the principles of the present invention.

FIG. 3 is a block diagram showing a charging system 200 for explaining the principles of the present invention. The charging system 200 includes an AC adapter 50, a charging circuit 1A, a charging circuit 3, a spare battery 4, a main battery 5, a diode 10, and a PNP transistor 11. The AC adapter 50 supplies a charging current to both charging circuit 1A and charging circuit 3. The spare battery 4 is a battery of low priority in charging, and the main battery 5 is a battery of high priority in charging. The PNP transistor 11 functions as a switching element.

Figure 4A:
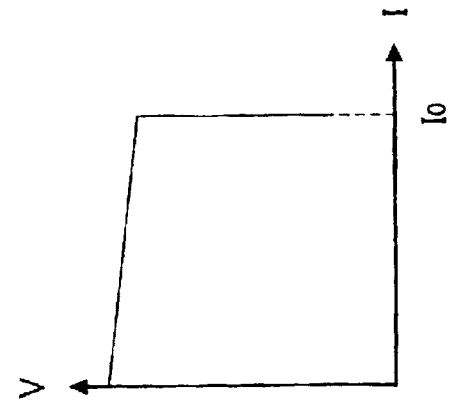
FIG. 4A is a graph showing the output characteristics of an AC adapter.
Figure 4B:
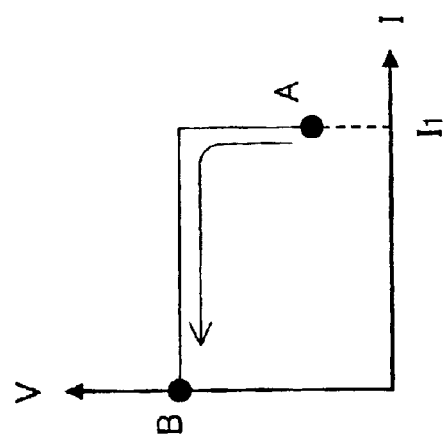
FIG. 4B is a graph showing the output characteristics of the charging circuit 3 of FIG. 3.
Figure 4C:
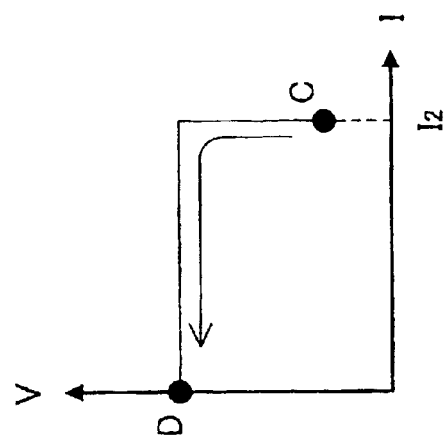
FIG. 4C is a graph showing the output characteristics of the charging circuit 1A of FIG. 3.

FIGS. 4A, 4B and 4C show the output characteristics of the AC adapter 50, the charging circuit 3, and the charging circuit 1A, respectively. In each of the FIGS. 4A, 4B and 4C, the horizontal axis represents the current (I), and the vertical axis represents the voltage (V). By referring to FIGS. 4A through 4C, a description will be given of a charging operation in a case where either the charging circuit 3 or the charging circuit 1A operates solely. In this case, it is assumed that a constant current $I_1$ (shown in FIG. 4B) of the charging circuit 3 and a constant current $I_2$ (shown in FIG. 4C) of the charging circuit 1A are provided by a constant current $I_0$ (shown in FIG. 4A) of the AC adapter 50. That is, $I_0 = I_1$ when the charging is performed only by the charging circuit 3, and $I_0 = I_2$ when the charging is performed only by the charging circuit 1A.

When charging the main battery 5 that is uncharged, since the battery voltage of the main battery 5 is low, the charging circuit 3 performs full charging according to the own output characteristic. "A" in FIG. 4B indicates this state, that is, a state where the main battery 5 is uncharged. Thereafter, according to the output characteristics of the charging circuit 3, the constant current $I_1$ is supplied to the main battery 5. Thus, the battery voltage of the main battery 5 is increased gradually. When the battery voltage of the main battery 5 is raised close to the no-load voltage of the charging circuit 3, the potential difference becomes zero and the charging current $I_1$ cannot be supplied to the main battery 5. Accordingly, the charging current $I_1$ decreases gradually and approaches zero. "B" in FIG. 4B indicates this state, that is, a state where the main battery 5 is fully charged. In addition, the charging circuit 1A charges the spare battery 4 in a similar manner. In this case, "C" and "D" in FIG. 4C corresponds to "A" and "B" in FIG. 4B, respectively.

Figure 5:
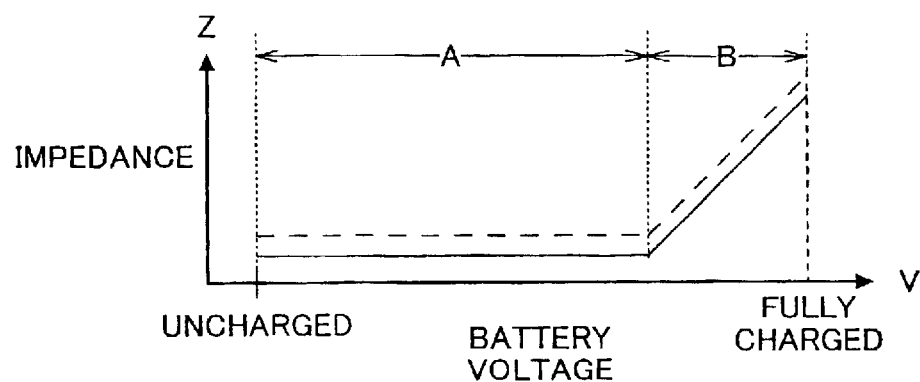
FIG. 5 is a graph for explaining charging operations of the charging circuits 3 and 1A in terms of the impedance.

FIG. 5 shows the impedance of each of the charging circuit 3 and the charging circuit 1A in the above-described charging operation. In FIG. 5, the horizontal axis represents the battery voltage (V), and the vertical axis represents the impedance (Z). In addition, a bold line indicates the impedance of the charging circuit 3, and a dotted line indicates that of the charging circuit 1A. As shown in FIG. 5, during constant-current charging (a section indicated by A in FIG. 5), the charging circuits 3 and 1 turn fully on and the impedance remains low. When constant-voltage charging is started (a section indicated by B in FIG. 5), the impedance is gradually increased. In FIG. 5, since the charging circuit 1A includes the diode 10, the impedance of the charging circuit 1A is higher than that of the charging circuit 3 (dotted line).

Next, a description will be given of a case where the charging circuit 3 and the charging circuit 1A are operated simultaneously, by referring to FIG. 6.

Figure 6:
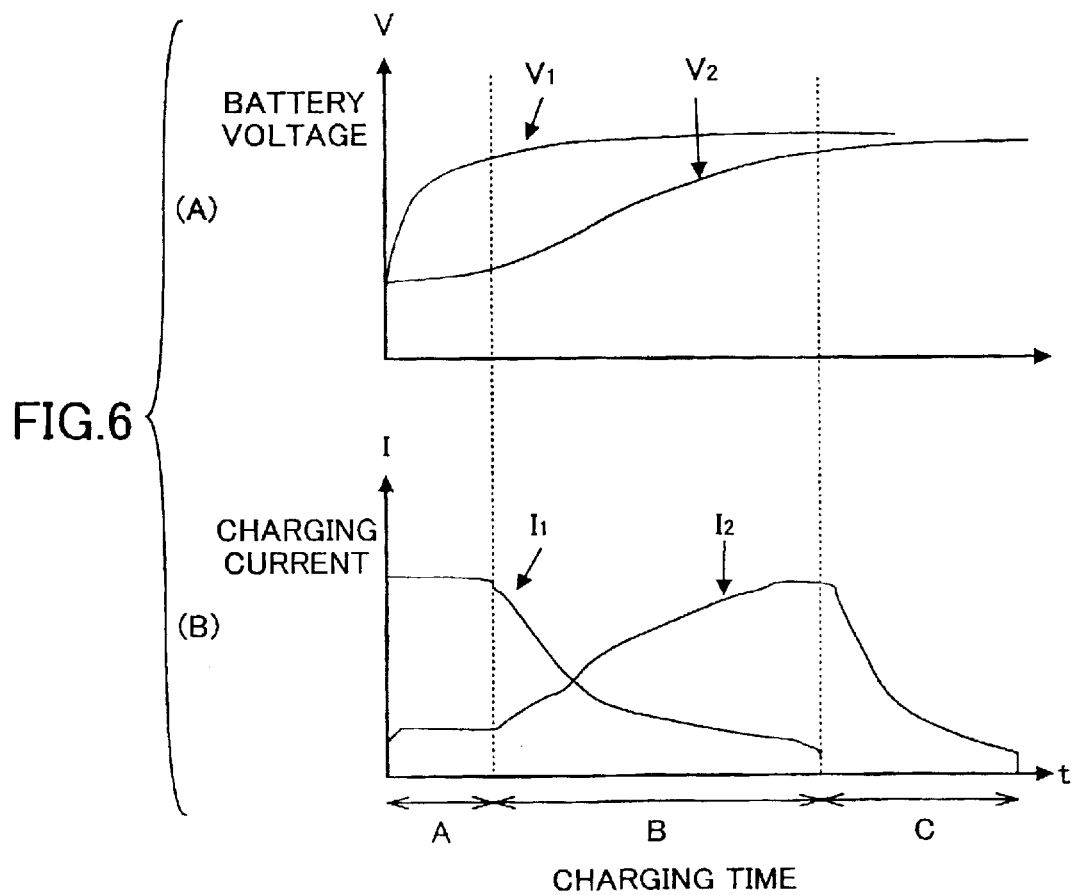
FIG. 6 shows graphs for explaining the charging operations of the charging circuits 3 and 1A when both are operated simultaneously.

The variations of the battery voltages of the main battery 5 and the spare battery 4 with charging time t are indicated by (A) in FIG. 6. In FIG. 6, $V_1$ represents the battery voltage of the main battery 5, and $V_2$ represents that of the spare battery 4. The variations of the charging currents $I_1$ and $I_2$ of the charging circuits 3 and 1A, respectively, with the charging time t are indicated by (B) in FIG. 6. In FIG. 6, the charging time t is divided into three sections: A, B and C.

When both of the charging circuits 3 and 1A charge uncharged batteries (main battery 5 and spare battery 4, respectively), since the battery voltages of the batteries are low, the charging circuits 3 and 1 charge the respective batteries by minimizing the impedance.

However, as shown in FIG. 5, the impedance of the charging circuit 1A is higher than that of the charging circuit 3. Thus, the constant current $I_0$ supplied from the AC adapter 50 is divided into the currents $I_1$ and $I_2$, according to the ratio of the impedance of the charging circuits 3 to that of the charging circuit 1A. The relationship among $I_0$, $I_1$ and $I_2$ is expressed as follows.

$$I_0 = I_1 + I_2 \quad (I_1 > I_2)$$

For this reason, in the section A, the battery voltage $V_1$ of the main battery 5 increases rapidly, while the battery voltage $V_2$ of the spare battery 4 increases gradually. Additionally, in the section A, the ratio of the charging current $I_1$ to the charging current $I_2$ changes such that the ratio becomes smaller, though the change is modest. In other words, the charging current $I_1$ decreases, while the charging current $I_2$ increases. This is caused by the variations of the battery impedance of the main battery 5 and that of the spare battery 4. It should be noted that as the main battery 5 and the spare battery 4 are charged, each of their respective battery impedances increases.

As the battery voltage $V_1$ of the main battery 5 approaches the full charge voltage, the charging current $I_1$ decreases. At this moment, the impedance of the charging circuit 3 is increasing. Hence, the impedance of the charging circuit 1A is relatively lower than that of the charging circuit 3. Consequently, the charging current $I_2$ supplied to the charging circuit 1A increases as much as the decrease of the charging current $I_1$ supplied to the charging circuit 3. Thereafter, the ratio of the charging current $I_1$ to the charging current $I_2$ gradually becomes small, and the value of the charging current $I_1$ and that of the charging current $I_2$ are reversed in the section B. However, it should be noted that $I_0 = I_1 + I_2$ is still satisfied in the section B.

Then, in the section C, the charging of the main battery 5 is completed and only the spare battery 4 is charged. An explanation thereafter is omitted since the charging operation in the section C is the same as that in the above-described case where either the charging circuit 3 or 1A is operated solely.

Additionally, it should be noted that even when charging the batteries (main battery 5 and spare battery 4) in different states (each having a different voltage), the charging operation is performed in a similar manner. That is, the charging operation is performed such that the charging currents $I_1$ and $I_2$ are determined according to the difference of the impedance between the charging circuits 3 and 1A so as to charge the main battery 5 and the spare battery 4, respectively.

Further, the diode 10 in the charging circuit 1A serves to produce the difference of the impedance between the charging circuits 3 and 1A. However, the same effect may be obtained when a resistor is used instead of the diode 10. However, there are some differences between the diode 10 and the resistor. For example, the diode 10 consistently has an almost constant voltage Vf, while in the resistor, voltage loss varies depending on the value of the current. However, this is not a problem since, in the section A, the voltage loss also becomes constant. The reason for this is that, in the section A, the constant-current charging is performed and the charging current $I_1$ is kept higher than the charging current $I_2$. Further, when the resistor is used, it is possible to set the resistance finely. Accordingly, there is an advantage in that the value of the charging currents in the section A can be set finely.

In the following, a description will be given of the embodiment of the present invention applying the above-described basic principles, by referring to FIGS. 7 through 11.

Figure 7:
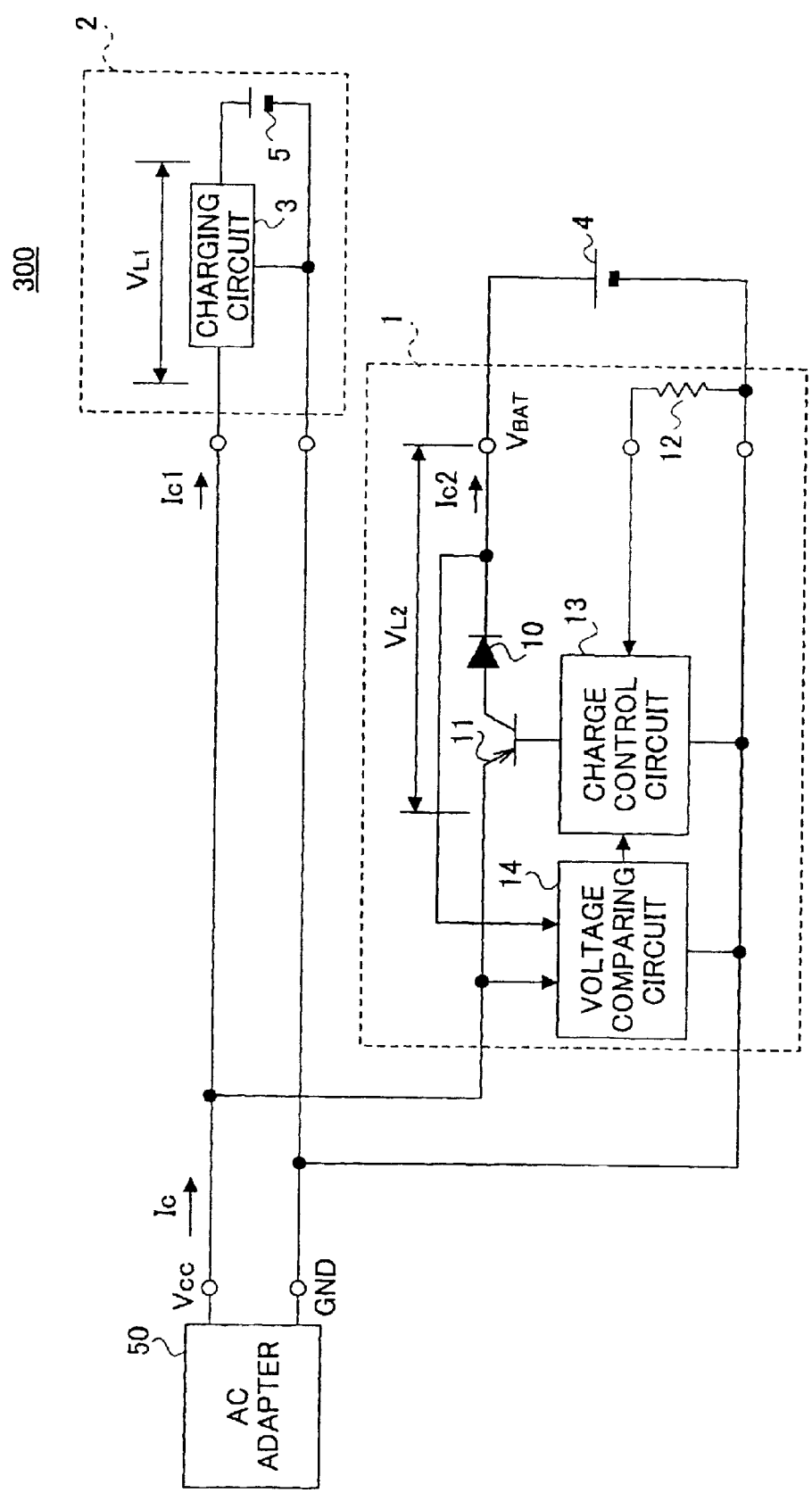
FIG. 7 is a block diagram showing an example of the structure of a charging system according to an embodiment of the present invention.

FIG. 7 shows an example of the structure of a charging system using a charging circuit according to the embodiment of the present invention. In FIG. 7, those parts that are the same as those corresponding parts in FIG. 3 are designated by the same reference numerals. A charging system 300 in FIG. 7 includes a charging circuit 1, a mobile set 2 such as a mobile phone incorporating the main battery 5 that has the high priority in charging, the spare battery 4 that is charged by the charging circuit 1 and has the low priority in charging, and the adapter 50. The spare battery 4 and the main battery 5 are, for example, lithium ion batteries.

The charging system 300 supplies the charging current to the spare battery 4 and the main battery 5 simultaneously. The charging system 300 can simultaneously charge both of the batteries while giving the main battery 5 priority over the spare battery 4 by giving the main battery 5 a charging current that is greater than that for the spare battery 4.

In addition, in the charging system 300, each of the spare battery 4 and the main battery 5 is equipped with a light emitting diode (LED) (not shown) that indicates the charging state thereof. The LEDs do not illuminate when the corresponding batteries are not being charged so as to indicate a waiting state, while illuminate red during charging of the batteries, and illuminate green when the charging is completed, for example.

The AC adapter 50 converts an alternating current supplied from an alternator (not shown) to a direct current, and supplies the direct current to the spare battery 4 and the main battery 5 as a charging current $I_c$. Hereinafter, it is assumed that the maximum value of the charging current that can be supplied to the main battery 5 is the same as the maximum value of the charging current that can be supplied to the spare battery 4. In addition, the maximum value of the charging current $I_c$ supplied by the AC adapter 50 is greater than each of the maximum values of the charging currents that can be supplied to the main battery 5 and the spare battery 4. Further, the maximum value of the charging current $I_c$ is smaller than the value that is twice as much as each of the maximum values of the charging currents that can be supplied to the main battery 5 and the spare battery 4. Also, a direct-current power source may be used instead of the AC adapter 50.

The mobile set 2 incorporates the charging circuit 3 and the main battery 5. The charging circuit 3 supplies a charging current $I_{c1}$, which is from the AC adapter 50, to the main battery 5. Hence, the main battery 5 is charged.

The charging circuit 1 includes the diode 10 as current setting means placed in a supply route of the charging current to the spare battery 4, the PNP transistor 11 as the switching element, a resistor 12 as a thermistor element for temperature control of the spare battery 4, a charge control circuit 13 controlling the PNP transistor 11, and a voltage comparing circuit 14. In addition, a resistor may be used instead of the diode 10.

Further, the actual resistor 12 as the thermistor element is arranged in the vicinity of the spare battery 4 and incorporated in a battery pack (not shown) with the spare battery 4.

As for the diode 10, the cathode is connected to the spare battery 4, and the anode is connected to the collector of the PNP transistor 11. Regarding the PNP transistor 11, the emitter is connected to the AC adapter 50, and the base is connected to the charge control circuit 13.

The charge control circuit 13 is connected to the base of the PNP transistor 11, the resistor 12 and the voltage comparing circuit 14. Additionally, the voltage comparing circuit 14 is connected to the AC adapter 50, the cathode of the diode 10 and the charge control circuit 13.

The charge control circuit 13 operates by using the output voltage of the AC adapter 50 as a power source. In an initial state, the charge control circuit 13 outputs a low level control signal to the base of the PNP transistor 11. Therefore, the PNP transistor 11 assumes an ON state, and a charging current $I_{c2}$ is supplied from the AC adapter 50 to the spare battery 4. Hence, the spare battery 4 is charged.

In other words, immediately after the charging is started, the main battery 5 is charged with the charging current $I_{c1}$, while the spare battery 4 is charged with the charging current $I_{c2}$. On this occasion, the current obtained by adding the charging current $I_{c1}$ and the charging current $I_{c2}$ is the charging current $I_c$ supplied from the AC adapter 50.

The ratio of the charging current $I_{c1}$ to the charging current $I^{c2}$ is inversely proportional to the ratio of the impedance of the charging circuit 3 to the impedance of the charging circuit 1 including the diode 10. Since the diode 10 is connected within the charging circuit 1, the impedance of the charging circuit 1 is greater than that of the charging circuit 3. Thus, the charging current $I_{c2}$ is smaller than the charging current $I_{c1}$. Additionally, in the charging circuit 3, the impedance of a controlling element (not shown) such as a built-in transistor is controlled so that the charging current $I_{c1}$ becomes the maximum charging current that can be supplied to the main battery 5.

Thereafter, according to constant-current control by the charging circuit 3, the predetermined charging current $I_{c1}$, is continuously supplied to the main battery 5, and the predetermined charging current $I_{c2}$ obtained by subtracting the charging current $I_{c1}$ from the charging current IC, which is supplied from the AC adapter 50, is continuously supplied to the spare battery 4.

Hence, the voltages of the main battery 5 and the spare battery 4 gradually rise. However, as mentioned above, since the charging current $I_{c1}$ supplied to the main battery 5 is greater than the charging current $I_{c2}$ supplied to the spare battery 4, the voltage of the main battery 5 rises faster.

When the main battery 5 is almost fully charged and the voltage of the main battery 5 reaches a predetermined value, the charging circuit 3 performs constant-voltage control, and the impedance of the charging circuit 3 is increased. Consequently, the charging current $I_{c1}$ supplied to the main battery 5 is decreased by degrees. Then, when the charging current $I_{c2}$ reaches a predetermined value, the charge control circuit 13 in the charging circuit 1 performs the constant-current control so that the charging current exceeding the predetermined value does not flow to the spare battery 4.

Thereafter, when the spare battery 4 is almost fully charged and the voltage of the spare battery 4 reaches a predetermined value, the charge control circuit 13 in the charging circuit 1 switches the charge control from the constant-current control to the constant-voltage control. Accordingly, the charging current $I_{c2}$ supplied to the spare battery 4 is decreased by degrees.

In addition, the charge control circuit 13 detects the voltage of the resistor 12 as the thermistor element for the temperature control of the spare battery 4. The voltage variation of the resistor 12 represents the variation of resistance following the temperature change of the spare battery 4. Therefore, when the voltage of the resistor 12 becomes a predetermined value, assuming that the spare battery 4 reaches a high temperature since something is wrong with the spare battery 4, the charge control circuit 13 outputs a high level control signal to the PNP transistor 11. Hence, the PNP transistor 11 assumes an OFF state, and the charging current does not flow to the spare battery 4.

The voltage comparing circuit 14 operates as voltage comparing means. More specifically, the voltage comparing circuit 14 detects a supply voltage Vcc and the voltage $V_{BAT}$ of the spare battery 4, compares these voltages, and outputs the comparison result to the charge control circuit 13. When the comparison result of the voltage comparing circuit 14 indicates that the voltage $V_{BAT}$ of the spare battery 4 is greater than the supply voltage Vcc, the charge control circuit 13 operates as a charging current preventing part, and outputs the high level control signal to the PNP transistor 11 so as to avoid an erroneous operation and erroneous detection of the full charge. Thus, the PNP transistor 11 assumes an OFF state, and the charging current does not flow to the spare battery 4.

Figure 8:
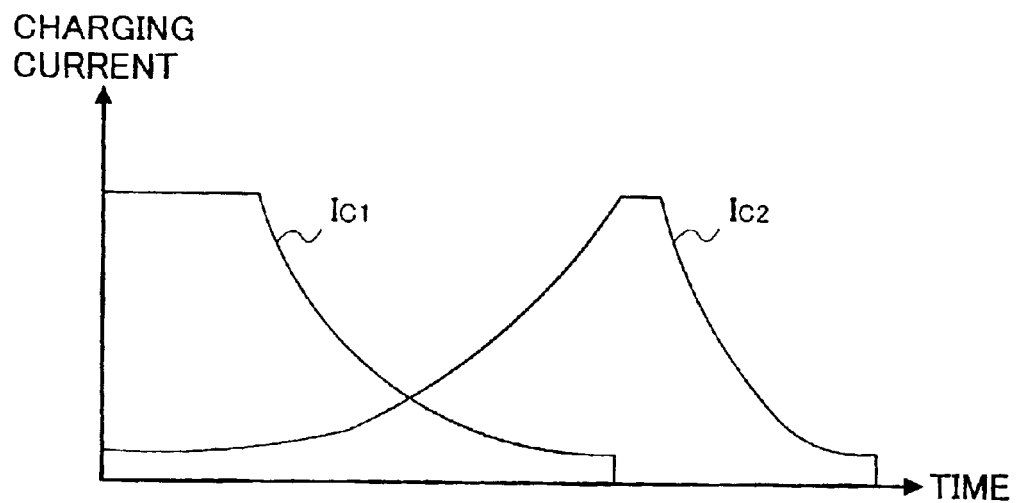
FIG. 8 is a graph showing the variation of charging currents with time when charging a main battery and a spare battery that are uncharged.

Next, by referring to FIGS. 8 through 11, a description will be given of the process of charging of the spare battery 4 and the main battery 5. FIG. 8 shows the variation of the charging currents $I_{c1}$ and $I_{c2}$ with time when charging the spare battery 4 and the spare battery 5 that are uncharged.

As shown in FIG. 8, during the charge of the main battery 5, the charging current $IC_1$ supplied to the main battery 5 is large, and the charging current $I_{c2}$ supplied to the spare battery 4 is small. In this state, the LED indicating the charging state of the spare battery 4 illuminates red, for example, so as to indicate that the spare battery 4 is being charged.

Thereafter, when the main battery 5 is almost fully charged, the charge control by the charging circuit 3 is changed to the constant-voltage control, the charging current $I_{c1}$ supplied to the main battery 5 is decreased, and the charging current $I_{c2}$ supplied to the spare battery 4 is increased. Then, when the charging current $I_{c2}$ reaches the predetermined value, the charge control circuit 13 in the charging circuit 1 performs the constant-current control so that the charging current exceeding the predetermined value does not flow to the spare battery 4. Subsequently, when the spare battery 4 is almost fully charged, the charge control by the charge control circuit 13 is changed to the constant-voltage control. Thus, the charging current $I_{c2}$ supplied to the spare battery 4 is decreased. When the charge of the spare battery 4 is completed, the LED indicating the charging state of the spare battery 4 illuminates green, for example, so as to indicate that the charging is completed.

Figure 9:
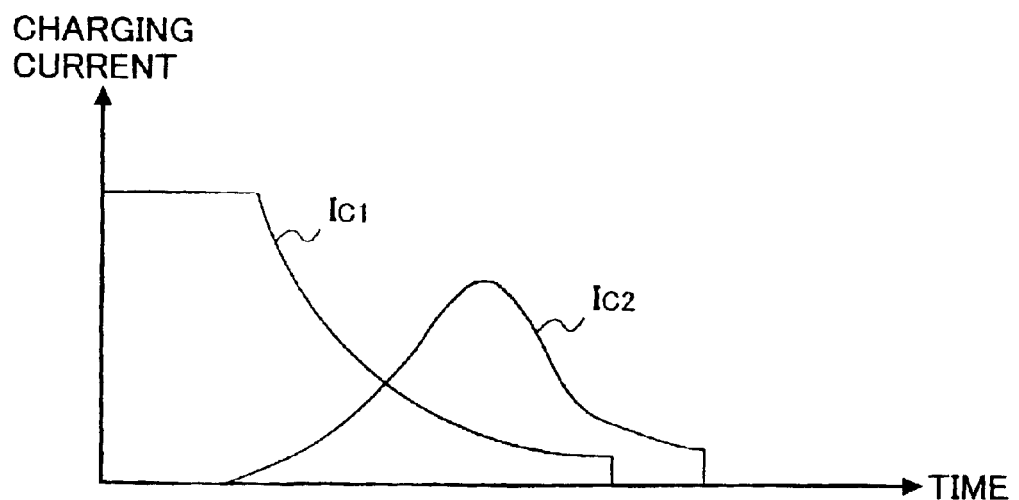
FIG. 9 is a graph showing the variation of the charging currents with time when charging an uncharged main battery and a spare battery that is almost fully charged.

FIG. 9 shows the variation of the charging currents $I_{c1}$ and $I_{c2}$ with time when charging the spare battery 4 that is almost fully charged and the uncharged main battery 5.

As shown in FIG. 9, in the beginning, since the spare battery 4 is almost fully charged, the charging current $I_{c2}$ is not supplied to the spare battery 4. On the other hand, the charging current $I_{c1}$ is supplied to the main battery 5 according to the constant-current control by the charging circuit 1. In this state, the LED indicating the charging state of the spare battery 4 does not illuminate so as to indicate that the spare battery 4 is in a standby state.

In addition, the standby state of the spare battery 4 may be eliminated by setting. Also, as shown in FIG. 8, a small charging current may be supplied to the spare battery 4.

Thereafter, when the main battery 5 is almost fully charged, the charge control by the charging circuit 1 is changed to the constant-voltage control, and the charging current $I_{c1}$ supplied to the main battery 5 is decreased. In this state, since the spare battery 4 discharges slightly, the charging current $I_{c2}$ is supplied. However, because the spare battery 4 is soon fully charged, the charging current $I_{c2}$ is decreased. Then, at the moment when the charging current $I_{c2}$ becomes zero, the LED indicating the charging state of the spare battery 4 illuminates green, for example, so as to indicate the completion of the charging.

Figure 10:
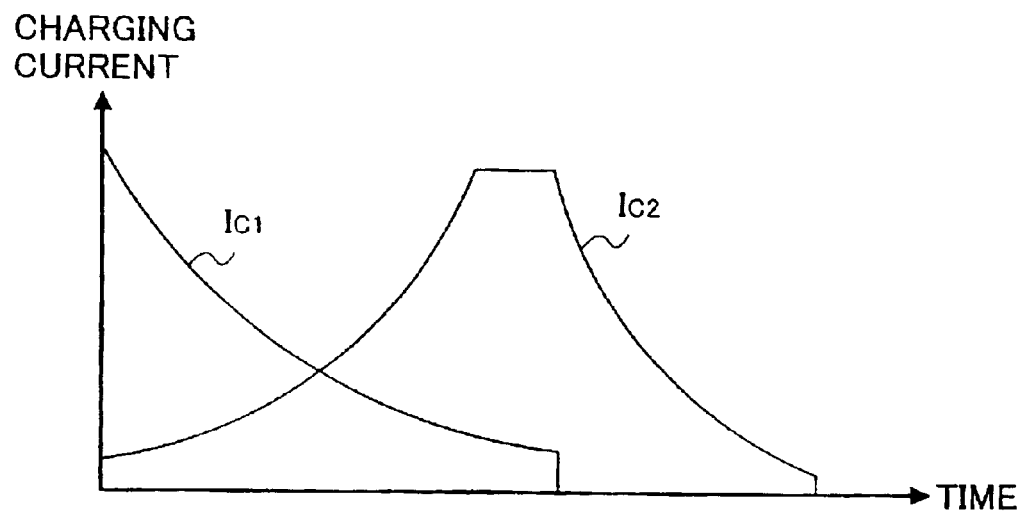
FIG. 10 is a graph showing the variation of the charging currents with time when charging a main battery that is almost fully charged and an uncharged spare battery.

FIG. 10 shows the variation of the charging currents $I_{c1}$ and $I_{c2}$ with time when charging the uncharged spare battery 4 and the main battery 5 that is almost fully charged.

As shown in FIG. 10, at first, the charging current $I_{c1}$ supplied to the main battery 5 is greater than the charging current $I_{c2}$ supplied to the spare battery 4. However, since the main battery 5 is almost fully charged, the charging current $I_{c1}$ is immediately decreased. Therefore, the charging current $I_{c2}$ supplied to the spare battery 4 is increased. Then, when the charging current $I_{c2}$ reaches the predetermined value, the constant-current control is performed by the charge control circuit 13 in the charging circuit 1. Thereafter, when the spare battery 4 is almost fully charged, the constant-voltage control is performed by the charge control circuit 13 in the charging circuit 1, and the charging current $I_{c2}$ is decreased. When the charging of the spare battery 4 is completed, the color of the light of the LED indicating the charging state of the spare battery 4 is changed to green, for example, so as to indicate the completion of the charging from such as red indicating that the charging is being performed.

Figure 11:
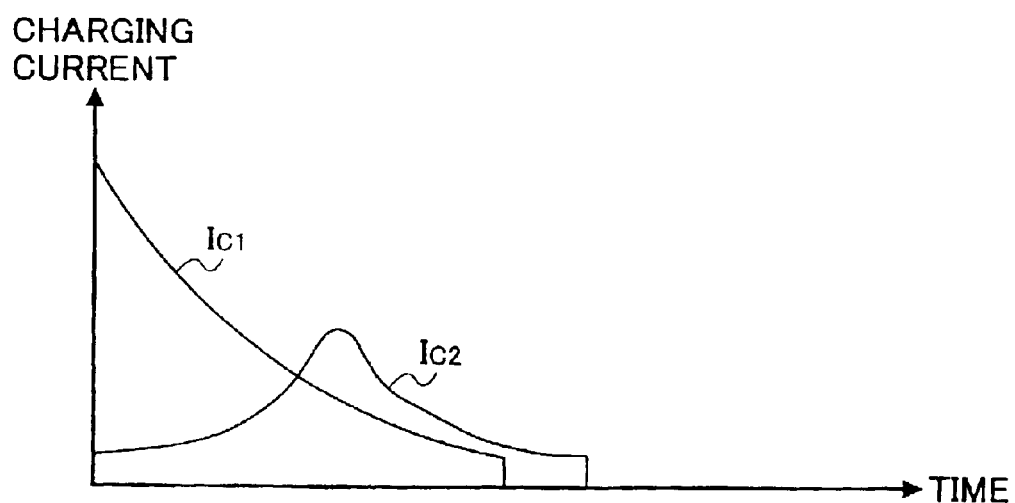
FIG. 11 is a graph showing the variation of the charging currents with time when charging a main battery and a spare battery that are almost fully charged.

FIG. 11 shows the variation of the charging currents $I_{c1}$ and $I_{c2}$ with time when both of the spare battery 4 and main battery 5 are almost fully charged.

As shown in FIG. 11, in the beginning, charging currents $I_{c1}$ and $I_{c2}$ are supplied to the spare battery 4 and the main battery 5, respectively, since the both are discharged slightly. In this case, the charging current $I_{c1}$ supplied to the main battery 5 is greater than the charging current $I_{c2}$ supplied to the spare battery 4. However, since the main battery 5 is fully charged immediately, the charging current $I_{c1}$ is decreased. Thus, the charging current $I_{c2}$ supplied to the spare battery 4, which is in a slightly discharged state, is once increased and soon decreased since the spare battery 4 is also soon fully charged. Then, at the moment when the charging of the spare battery 4 is completed, the color of the light of the LED indicating the charging state of the spare battery 4 is changed from red to green, for example, so as to indicate that the charging state is changed from charging to completion of the charging.

As described above, in the charging system 300 according to this embodiment, it is possible to simultaneously charge the main battery 5 and the spare battery 4 while giving priority to the main battery 5, by providing the diode 10 in the supply route of the charging current to the spare battery 4 so as to make the impedance of the charging circuit 1 higher than that of the charging circuit 3. Also, in the charging system 300, as the charging current supplied to the main battery 5 is decreased, the charging current supplied to the spare battery 4 is increased. Thus, it is possible to realize an effective charging.

In addition, the setting of the charging current can be performed easily by using the diode 10 or a resistor instead of the diode 10. Accordingly, it is possible to reduce the cost since a microprocessor, a control circuit and the like are not required unlike as in a conventional way.

Further, in a case where the supply voltage falls below the voltage of the spare battery 4, the charge control circuit 13 prevents the charging current from flowing to the spare battery 4. Therefore, it is possible to avoid an erroneous operation and erroneous detection of the full charge.

Moreover, in the above-described embodiment, the description is given by assuming that the main battery 5 has the high priority in the charging and the spare battery 4 has the low priority in the charging. However, the converse is also possible. Additionally, the present invention may be applied not only to the charging of the main battery 5 and the spare battery 4, but also to a case where a battery having a high priority and a battery having a low priority are both charged.

Furthermore, in the above-described embodiment, the description is given of the example where each of the charging circuit 3 and the charge control circuit 13 of the spare battery 4 performs constant-current control. However, the present invention may be applied to a case where only the AC adapter 50 that supplies the charging current $I_c$ performs constant-current control, and the charging circuit 3 and the charge control circuit 13 of the spare battery 4 do not perform constant-current control.

Additionally, in the above-described embodiment, a case is assumed where, in the charging system 300, the main battery 5 in the mobile set 2 and the spare battery 4 are simultaneously charged, and the charging circuit 3 is incorporated in the mobile set 2. In this case, the main battery 5 is charged through the mobile set 2 in the charging system 300. However, the present invention may be also applied to a case where two batteries are directly and simultaneously charged by a charging circuit (a variation of the embodiment). In this case, the charging circuit includes both charging circuit 1 and charging circuit 3, and the two batteries are charged by the charging circuit in a manner similar to that of the above-described embodiment.

Further, the present invention includes a battery charger incorporating the above-described charging circuit. A description will be given of the battery charger incorporating the charging circuit according to the present invention, by referring to FIGS. 12 and 13.

Figure 12:
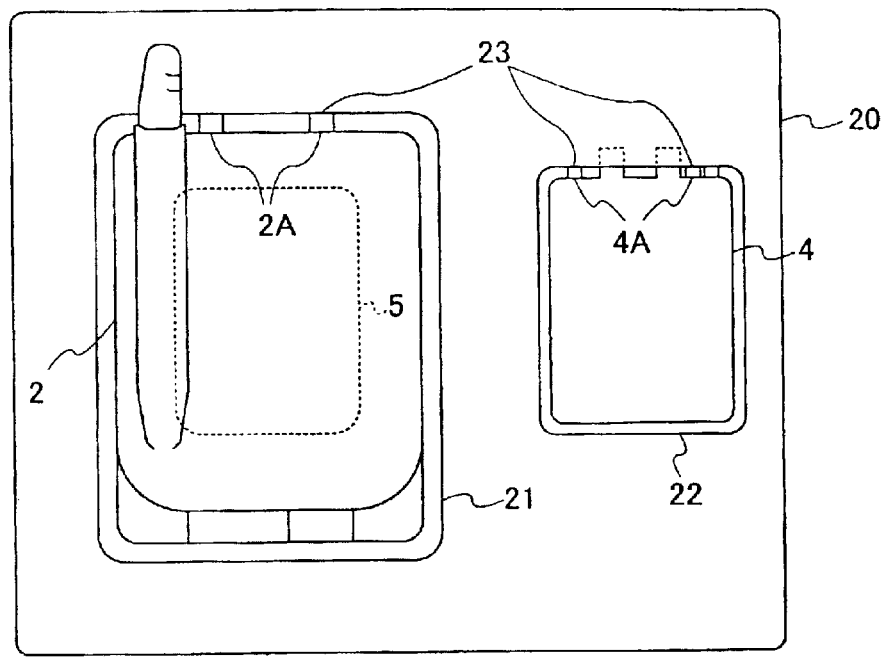
FIG. 12 is a schematic plan view showing an example of a battery charger.
Figure 13:
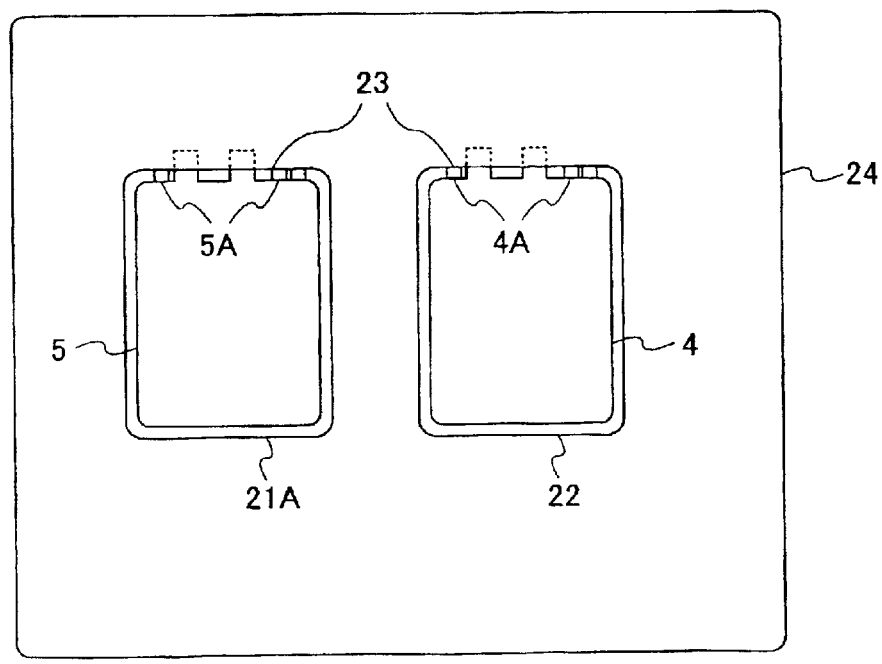
FIG. 13 is a schematic plan view showing an example of another battery charger.

In FIGS. 12 and 13, those parts that are the same as those corresponding parts in FIG. 7 are designated by the same reference numerals, and a description thereof will be omitted.

FIG. 12 is a diagram showing an example of a battery charger according to the present invention capable of charging the main battery 5 inserted in the mobile set 2 and the spare battery 4. In FIG. 12, a case is shown where the mobile set 2 including the main battery 5 and the spare battery 4 are inserted in (held by) a battery charger 400A. The battery charger 400A includes a case (housing) 20 incorporating the charging circuit according to the above-mentioned embodiment of the present invention, a first holding part 21 in which the mobile set 2 such as a mobile phone is inserted, and a second holding part 22 in which the spare battery 4 is inserted. Contact terminals 23 are extending inside each of the first holding part 21 and the second holding part 22. In addition, charging terminals 2A are exposed at a top part of the mobile set 2, and charging terminals 4A are also exposed at a top part of the spare battery 4. When each of the charging terminals 2A and the charging terminals 4A contact the contact terminals 23 of the battery charger 400A, the battery charger 400A senses the presence of the main battery 5 and the spare battery 4, and the charging is performed by the charging circuit according to the embodiment of the present invention in a manner similar to the above-described charging operation.

FIG. 13 is a diagram showing an example of a battery charger according to the present invention capable of charging the main battery 5 detached from the mobile set 2 and the spare battery 4. In FIG. 13, a case is shown where the main battery 5 and the spare battery 4 are inserted in a battery charger 400B. In FIG. 13, those parts that are the same as those corresponding parts in FIG. 12 are designated by the same reference numerals, and a description thereof will be omitted. The battery charger 400B has almost the same construction as that of the battery charger 400A. However, the battery charger 400B is different from the battery charger 400A in that the battery charger 400A incorporates the charging circuit according to the variation of the embodiment of the present invention. Thus, not the mobile set 2 but the main battery 5 is directly inserted in (held by) a receiving part 21A of the battery charger 400B. Charging terminals 5A are exposed at the top part of the main battery 5. When each of the charging terminals 5A of the main battery 5 inserted in the first holding part 21A and the charging terminals 4A of the spare battery 4 inserted in the second holding part 22 contact the contact terminals 23 extending inside the first holding part 21A and the second holding part 23, the battery charger 400B senses the presence of the main battery 5 and the spare battery 4, and the charging is performed by the charging circuit according to the variation of the embodiment of the present invention.

Hence, according to one aspect of the present invention, there is provided a charging circuit including: a housing 20 incorporating a charging circuit charging a predetermined battery 4; a first holding part 21 formed on a top surface of the housing 20 and configured to hold a mobile set 2 in which a first battery 5 is inserted; and a second holding part 22 formed on the top surface of the housing 20 and configured to hold the predetermined battery 4, the charging circuit including: a circuit configuration by which a second charging current charging the predetermined battery 4 is obtained by subtracting a first charging current charging the first battery 5 from a current supplied by a power source; and a current setting part 10 that sets the second charging current smaller than the first charging current.

Further, according to another aspect of the present invention, there is provided a charging circuit including: a housing 24 incorporating a charging circuit charging predetermined first and second batteries 5,4; a first holding part 21A formed on a top surface of the housing 24 and configured to hold the first battery 5; and a second holding part 22 formed on the top surface of the housing 24 and configured to hold the second battery 4, the charging circuit including: a circuit configuration by which a second charging current charging the second battery 4 is obtained by subtracting a first charging current charging the first battery 5 from a current supplied by a power source; and a current setting part 10 that sets the second charging current smaller than the first charging current.

According to the above-mentioned aspects of the present invention, the second charging current is obtained by subtracting the first charging current used for charging the first battery in the first charging circuit from the current supplied by the power source. In addition, the amount of the second charging current is set smaller than that of the first charging current at least in the beginning of charging so that the first battery is charged earlier than the second battery (predetermined battery). Hence, it is possible to perform effective charging while continuously varying the first and second charging currents and effectively using the charging current supplied by the power source.

Moreover, according to another aspect of the present invention, in the above-described charging circuit, a diode may be used for the current setting part 10.

In addition, according to another aspect of the present invention, in the above-described charging circuit, a resistor may be used for the current setting part 10.

According to the above-mentioned aspects of the present invention, it is possible to set the charging currents simply. Thus, since a microcomputer, a control circuit, and the like are not required as in the conventional way, the cost can be reduced.

Further, according to another aspect of the present invention, the above-described charging circuit may further include a voltage comparing part 14 that compares a voltage of the second battery (predetermined battery) 4 with a supply voltage; and a charging current preventing part 13 that prevents the second charging current when the supply voltage falls below the voltage of the second battery (predetermined battery) 4.

According to the above-mentioned aspect of the present invention, the supply of the charging current for a battery having a low priority in charging is prevented when the supply voltage falls below the voltage of the battery having the low priority. Hence, it is possible to avoid an erroneous operation and erroneous detection of the full charge.

The present invention is not limited to the specifically disclosed embodiment, and variations and modifications may be made without departing from the scope of the present invention.

The present application is based on Japanese priority application No. 2002-053119 filed on Feb. 28, 2002, the entire contents of which are hereby incorporated by reference.

What is claimed is:

1. A charging circuit for charging at least a first battery either individually or together with a second battery from current supplied by a power source, the charging circuit comprising:

a circuit configuration providing a first charging current for charging the first battery and a second charging current for charging the second battery, wherein the second charging current is substantially a difference of the first charging current and the current supplied by the power source; and a current setting part for maintaining the amount of the second charging current to be less than the amount of the first charging current for at least an initial portion of time of charging one or more batteries, wherein the current setting part comprises a diode inserted in a charging path of the second battery for decreasing a charging voltage of the second battery.

2. The charging circuit as claimed in claim 1, further comprising:

a voltage comparing part that compares the charging voltage of the second battery and a supply voltage of the power source; and a charging current preventing part that prevents the flow of the second charging current when the supply voltage is less than the charging voltage of the second battery.

3. A charging circuit for charging at least a first battery either individually or together with a second battery from current supplied by a power source, the charging circuit comprising:

a circuit configuration providing a first charging current for charging the first battery and a second charging current for charging the second battery, wherein the second charging current is substantially a difference of the first charging current and the current supplied by the power source; and a current setting part for maintaining the amount of the second charging current to be less than the amount of the first charging current for at least an initial portion of time of charging one or more batteries, wherein the current setting part comprises a resistor inserted in a charging path of the second battery for decreasing a charging voltage of the second battery.

4. The charging circuit as claimed in claim 3, further comprising:

a voltage comparing part that compares the charging voltage of the second battery and a supply voltage of the power source; and a charging current preventing part that prevents the flow of the second charging current when the supply voltage is less than the charging voltage of the second battery.

5. A battery charger for charging at least a first battery either individually or together with a second battery from current supplied by a power source, the battery charger comprising:

a housing containing a charging circuit therein and having a first holding part and a second holding part, wherein the first holding part is configured to hold a mobile set in which to insert the first battery and the second holding part is configured to hold the second battery, and wherein said charging circuit comprises:

a circuit configuration providing a first charging current for charging the first battery and a second charging current for charging the second battery, wherein the second charging current is substantially a difference of the first charging current and the current supplied by the power source; and a current setting part for maintaining the amount of the second charging current to be less than the amount of the first charging current for at least an initial portion of time of charging one or more batteries, wherein the current setting part comprises a diode inserted in a charging path of the second battery for decreasing a charging voltage of the second battery.

6. The battery charger as claimed in claim 5, further comprising:

a voltage comparing part that compares the charging voltage of the second battery and a supply voltage of the power source; and a charging current preventing part that prevents the flow of the second charging current when the supply voltage is less than the charging voltage of the second battery.

7. A battery charger for charging at least a first battery either individually or together with a second battery from current supplied by a power source, the battery charger comprising:

a housing containing a charging circuit therein and having a first holding part and a second holding part, wherein the first holding part is configured to hold a mobile set in which to insert the first battery and the second holding part is configured to hold the second battery, and wherein said charging circuit comprises:

a circuit configuration providing a first charging current for charging the first battery and a second charging current for charging the second battery, wherein the second charging current is substantially a difference of the first charging current and the current supplied by the power source; and a current setting part for maintaining the amount of the second charging current to be less than the amount of the first charging current for at least an initial portion of time of charging one or more batteries, wherein the current setting part comprises a resistor inserted in a charging path of the second battery for decreasing a charging voltage of the second battery.

8. The battery charger as claimed in claim 7, further comprising:

a voltage comparing part that compares the charging voltage of the second battery and a supply voltage of the power source; and a charging current preventing part that prevents the flow of the second charging current when the supply voltage is less than the charging voltage of the second battery.

9. A battery charger for charging at least a first battery either individually or together with a second battery from current supplied by a power source, the battery charger comprising:

a housing containing a charging circuit therein and having a first holding part and a second holding part, wherein the first holding part is configured to hold the first battery and the second holding part is configured to hold the second battery, and wherein said charging circuit comprises:

a circuit configuration providing a first charging current for charging the first battery and a second charging current for charging the second battery, wherein the second charging current is substantially a difference of the first charging current and the current supplied by the power source; and a current setting part for maintaining the amount of the second charging current to be less than the amount of the first charging current for at least an initial portion of time of charging one or more batteries, wherein the current setting part comprises a diode inserted in a charging path of the second battery for decreasing a charging voltage of the second battery.

10. The battery charger as claimed in claim 9, further comprising:

a voltage comparing part that compares a the charging voltage of the second battery and a supply voltage of the power source; and a charging current preventing part that prevents the flow of the second charging current when the supply voltage is less than the charging voltage of the second battery.

11. A battery charger for charging at least a first battery either individually or together with a second battery from current supplied by a power source, the battery charger comprising:

a housing containing a charging circuit therein and having a first holding part and a second holding part, wherein the first holding part is configured to hold the first battery and the second holding part is configured to hold the second battery, and wherein said charging circuit comprises:

a circuit configuration providing a first charging current for charging the first battery and a second charging current for charging the second battery, wherein the second charging current is substantially a difference of the first charging current and the current supplied by the power source; and a current setting part for maintaining the amount of the second charging current to be less than the amount of the first charging current for at least an initial portion of time of charging one or more batteries, wherein the current setting part comprises a resistor inserted in a charging path of the second battery for decreasing a charging voltage of the second battery.

12. The battery charger as claimed in claim 11, further comprising:

a voltage comparing part that compares the charging voltage of the second battery and a supply voltage of the power source; and a charging current preventing part that prevents the flow of the second charging current when the supply voltage is less than the charging voltage of the second battery.

* * * * *